United States Patent
Barrett

(10) Patent No.: US 11,475,154 B2
(45) Date of Patent: Oct. 18, 2022

(54) AGENT-BASED FILE REPOSITORY INDEXING AND FULL-TEXT FACETED SEARCH SYSTEM

(71) Applicant: Raytheon Company, Waltham, MA (US)

(72) Inventor: Nicholas Wayne Barrett, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 415 days.

(21) Appl. No.: 16/797,784

(22) Filed: Feb. 21, 2020

(65) Prior Publication Data

US 2021/0264049 A1    Aug. 26, 2021

(51) Int. Cl.
| | | |
|---|---|---|
| *G06F 16/22* | (2019.01) | |
| *G06F 21/62* | (2013.01) | |
| *H04L 9/32* | (2006.01) | |
| *G06F 16/248* | (2019.01) | |
| *G06F 16/2455* | (2019.01) | |

(52) U.S. Cl.
CPC ...... *G06F 21/6227* (2013.01); *G06F 16/2272* (2019.01); *G06F 16/248* (2019.01); *G06F 16/24558* (2019.01); *H04L 9/3239* (2013.01)

(58) Field of Classification Search
CPC .......................... G06F 16/2272; G06F 16/248
See application file for complete search history.

(56) References Cited

U.S. PATENT DOCUMENTS

| | | |
|---|---|---|
| 7,236,975 B2 | 6/2007 | Mccauley et al. |
| 7,636,710 B2 | 12/2009 | Borthakur et al. |
| 8,099,779 B2 | 1/2012 | Owen et al. |
| 8,239,354 B2 | 8/2012 | Lacapra et al. |
| 8,417,746 B1 | 4/2013 | Gillett, Jr. et al. |
| 10,146,953 B1 * | 12/2018 | Bean ...................... H04L 63/08 |

(Continued)

OTHER PUBLICATIONS

"7 Free Tools to Search Shared Folders on the Local Network 7 Free Tools to Search Shared Folders on the Local Network", Raymond.CC, [Online]. Retrieved from the Internet: <URL: https://www.raymond.cc/blog/search-find-and-locate-any-files-on-local-area-network-shared-folders/>, (2021), 7 pgs.

(Continued)

*Primary Examiner* — Eliyah S. Harper

(74) *Attorney, Agent, or Firm* — Schwegman Lundberg & Woessner, P.A.

(57) ABSTRACT

A computer-implemented method includes retrieving a tenant identifier of a plurality of tenant identifiers identifying a set of users with authorized access to one or more data repositories of a plurality of data repositories. An indexing agent associated with the tenant identifier is configured based on indexing configuration information. The indexing configuration information includes at least an identifier of the one or more data repositories, location information for accessing the repositories, and one or more file patterns. Indexed data associated with the tenant identifier is retrieved from an indexing server executing the indexing agent. The indexed data includes text data obtained by the indexing agent during indexing using at least one data file associated with the one or more file patterns and stored in the one or more data repositories, and a cryptographic hash of the at least one data file.

20 Claims, 11 Drawing Sheets

(56) References Cited

U.S. PATENT DOCUMENTS

| | | | | |
|---|---|---|---|---|
| 10,929,415 | B1* | 2/2021 | Shcherbakov | G06F 3/04842 |
| 10,936,585 | B1* | 3/2021 | Echeverria | G05B 13/00 |
| 11,068,617 | B2* | 7/2021 | Shirole | G06F 40/177 |
| 11,151,283 | B2* | 10/2021 | Schwed | H04L 63/0414 |
| 11,233,832 | B2* | 1/2022 | Chauhan | G06F 3/0483 |
| 11,263,268 | B1* | 3/2022 | Bourbie | G06F 16/90328 |
| 2005/0171932 | A1 | 8/2005 | Nandhra | |
| 2011/0225165 | A1* | 9/2011 | Burstein | G06F 16/2272 707/741 |
| 2014/0317087 | A1* | 10/2014 | Collins | G06F 16/2455 707/715 |

OTHER PUBLICATIONS

"Void Tools", [Online]. Retrieved from the Internet: <URL: http://www.voidtools.com/>, (Accessed May 3, 2022), 1 pg.

Henry, Allan, "Five Best Desktop Search Applications", Life Hacker, [Online]. Retrieved from the Internet: <URL: https://lifehacker.com/5988004/five-best-desktop-search-applications>, (Mar. 3, 2013), 8 pgs.

\* cited by examiner

← HIDE FILTERS

| AVAILABLE CATEGORIES | ∨ |
|---|---|
| REPOSITORY | |
| REPOSITORY NAME | 337,990 |
| REPOSITORY NAME | 239,978 |
| REPOSITORY NAME | 163,137 |
| FILE OWNER | ∨ |
| SIZE (BYTES) | ∨ |
| FILE EXTENSION | |
| png | 188,738 |
| xls | 94,760 |
| jpg | 57,639 |
| pptx | 24,713 |
| docx | 16,825 |
| tif | 16,445 |
| txt | 15,736 |
| html | 14,724 |
| pdf | 12,168 |
| htm | 16,825 |
| Show More... | |
| CREATED DATE | ∨ |
| LAST MODIFIED DATE | ∨ |
| LAST ACCESSED DATE | ∨ |
| HASH | |

210

SEARCH BY KEYWORD     🔍 SEARCH

YOUR CURRENT SEARCH     SAVED SEARCHES ✖ CLEAR

ALL RESULTS

▦ SEARCH RESULTS (740,705)     ▦ TABLE VIEW ▦ LIST VIEW

| REPOSITORY | FILE LOC'N INFO | FILE OWNER | SIZE (BYTES) | CREATED DATE |
|---|---|---|---|---|
| AAA BBB SHARE | \SERVER1\FOLDER2\SUBFOLDER3\FILE.PPTX | USER8976 | 52,257,216 | OCT. 25, 2017 |
| AAA BBB SHARE | C:\FOLDER1\FILE1.ZIP | USER8976 | 55,442,033 | OCT. 25, 2017 |
| AAA BBB SHARE | \SERVER2\FOLDER4\SUBFOLDER\FILE.XLS | USER8976 | 55,441,744 | OCT. 25, 2017 |

224

FIRST | PREVIOUS | 1 | 2 | 3 | 4 | 5 | 6 | 7 | 8 | 9 | 10 | NEXT | LAST

RECORDS PER PAGE [20 ▼]     ▦ DOWNLOAD TO EXCEL     OCT. 25, 2017

222

US 11,475,154 B2

AGENT-BASED FILE REPOSITORY INDEXING AND FULL-TEXT FACETED SEARCH SYSTEM

TECHNICAL FIELD

Some embodiments relate to a multi-faceted search system with file repository indexing. More specifically, some embodiments relate to distributed, agent-based near-real-time file repository indexing and a full-text faceted search system.

BACKGROUND

With today's existing collaboration and file management tools, network users experience significant challenges in utilizing prior work stored in files in multiple repositories. For example, different network user teams (e.g., collaboration teams) may rely on file repositories containing millions of files with total sizes of multiple terabytes struggle with finding precise files by content keyword or metadata characteristics or duplicate files.

Existing search solutions for network user teams do not adequately meet enterprise needs since legacy and working files cannot be searched in aggregate, leaving teams unable to manage data effectively and miss out on valuable reuse opportunities because of difficulty in data discoverability. The existing (or conventional) search solutions lack the searching capability of shared repositories, discoverability, and scalability. Additionally, most existing search solutions work on a single computer and not in a distributed fashion via a Web-based interface, with limited ability to search across multi-terabyte sized repositories in near real-time.

BRIEF DESCRIPTION OF THE DRAWINGS

The present disclosure is illustrated by way of example and not limitation in the figures of the accompanying drawings, in which like references indicate similar elements and in which:

FIG. 2A and FIG. 2B illustrate example user interfaces for presenting search results by the search system of FIG. 1, in accordance with some embodiments;

DESCRIPTION

Figure 1:
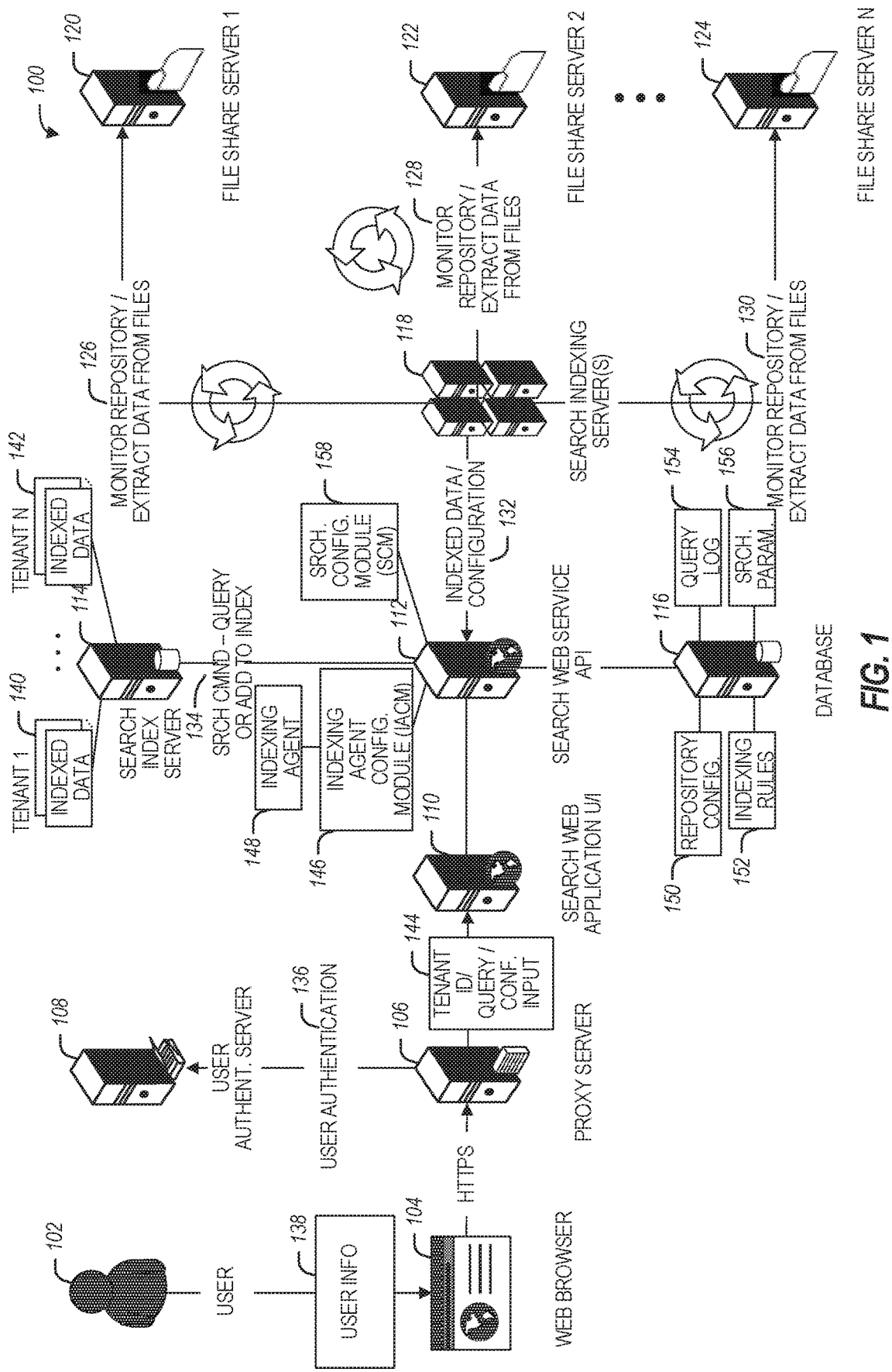
FIG. 1 illustrates a distributed, agent-based repository indexing and faceted search system, in accordance with some embodiments.

It should be understood at the outset that although an illustrative implementation of one or more embodiments is provided below, the disclosed systems, methods, and/or apparatuses described with respect to FIGS. 1-7 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "tenant" (indicated by a tenant identifier or a tenant ID) may be used to indicate an association among a group of users (e.g., multiple users may be associated with the same tenant identifier). Additionally, a tenant identifier may also indicate full logical isolation of information in a repository indexing and search system, where the tenant ID may also be associated with the data repositories, the search index (i.e., indexed data), and all other data that may flow through the repository indexing and search system. In this regard, one or more users associated with a tenant ID may index repositories or access indexed data that is also associated with the same tenant ID (and may not index or access data that is associated with another tenant ID).

Techniques disclosed herein can be used to configure a multi-tenant, agent-based search system that indexes file metadata and contents from repositories on local and remote computing devices in a periodic or near-real-time fashion, and aggregates data for selected named users to search via a secure Web interface and link to the original file locations in the repositories. The multi-tenant search system allows multiple teams (where each team may be associated with a tenant identifier or tenant ID) to use the same deployed information system, with data and access fully segregated by team. Put another way, a user authenticated for a search associated with one tenant ID may only access indexed data associated with that tenant ID and not data associated with other tenant IDs.

In some aspects, the disclosed multi-tenant search system may rely on Java agent applications that receive periodic configuration updates and send in to a centralized server execution status and extracted metadata and file contents that match customized file patterns. The search system can track diverse document repositories with millions of files, of multiple terabytes in size, and provides the ability to find files by text (even inside ZIP files), as well as allows users to find duplicate files, search and sort by metadata attributes, and also export result sets to third party applications (e.g., Excel) for offline analysis. In some aspects, the disclosed search system may be configured as a search Web service API that includes, e.g., an indexing agent configuration module (IACM) and a search configuration module (SCM). The IACM and the SCM may be configured to perform the discussed search-related functionalities, such as creation and configuration of repositories, configuration of repository indexing via indexers (or indexing agents), user authentication and tenant authentication in connection with executing search-related functions, user query validation and search execution using indexed data, storing/retrieving search queries via a multi-functional user interface, accessing and retrieving files from a repository for viewing based on location information provided in search results, etc. In this regard, the disclosed search platform is also associated with the following characteristics and features: multi-mode indexing of repositories, including periodic re-indexing (e.g., when repositories are updated) or live, near-real time indexing (e.g., to index repositories with new, updated, moved, or deleted files); enables indexing of files in remote tools (e.g. DocuShare, SharePoint, and FTP servers); scalable multi-tier, agent-based system architecture, which can index data from local and remote machines to a centralized and secured faceted search repository; on-the-fly configurable selective indexing of file types; deployable via agents on any operating system to machines located anywhere with a network; indexes and searches the metadata and textual file contents inside a large number of file formats, including compressed files (e.g., ZIP format files); shows duplicate files across machines or repositories based on cryptographic hash information; and multi-tenancy allows separate teams to use the same system instance with separate access control lists due to full-tier data segregation (e.g., similar to a Cloud Software-as-a-Service (SaaS) model).

FIG. 1 illustrates a distributed, agent-based repository indexing and faceted search system 100, in accordance with some embodiments. Referring to FIG. 1, search Web service application programming interface (API) 112 provides the application logic of the search system 100. The search Web service API 112 can include an indexing agent configuration module (IACM) 146 and a search configuration module (SCM) 158 which can be configured to perform search related functionalities discussed herein in connection with search information 138 received from a user 102.

In some aspects, the IACM 146 can configure an indexing agent 148 using the indexing rules 152 stored in database 116, where the indexing agent 148 is associated with (or registered with) a specific tenant identifier. The indexing agent 148 can be configured to execute from at least one search indexing server 118 coupled to a plurality of file share servers 120, 122, . . . , 124 to perform periodic indexing and re-indexing updates or live, near-real-time updates of new, updated, moved, or deleted files and data repositories stored in the file share servers 120, 122, . . . , 124. An example configuration of an indexing agent is illustrated in connection with FIG. 3, and an example configuration of repository indexing is illustrated in connection with FIG. 4B.

Even though FIG. 1 illustrates a single indexing agent 148, the disclosure is not limited in this regard and multiple indexing agents may be configured by the IACM 146. For example, multiple indexing agents may be configured for a single tenant identifier for accessing different file share servers, multiple indexing agents may be configured with different tenant identifiers.

In some aspects, the SCM 158 is configured to perform additional search-related functions within the search system 100, including creation and configuration of repositories (e.g., as discussed in connection with FIG. 4A), user authorization including tenant identifier authorization in connection with executing search-related functions, user query validation and search execution using indexed data (e.g., as illustrated in connection with FIG. 4C and FIG. 4D), storing/retrieving search queries via a multi-functional user interface, accessing and retrieving files from a repository for viewing based on location information provided in search results, etc.

User 102 can be a searcher user (e.g., a user providing tenant identification as well as a search query as part of search information 138 for purposes of performing a search) or an administration user (e.g., a user providing configuration input to manage or configure one or more features of the search system 100). The search information 138 can be entered via a Web browser 104 and can be initially received by a proxy server 106. In some aspects, the proxy server 106 can be an HTTP server (such as Apache, etc.) configured to provide single-sign-on authentication. In some aspects, the proxy server 106 can communicate with user authentication server 108 to provide user authentication functionalities 136. In some aspects, the user authentication server 108 or the proxy server 106 can be configured as a multi-tenancy service, providing lists of authorized tenant identifiers and user identifiers to assist other applications (such as the search Web service API 112) with the tenant and user validation for accessing the search system 100.

In this regard, the search information 138 entered by a searcher user 102 may include information identifying the user. After initial user authentication by the proxy server 106 the user authentication server 108, the user 102 may use the search Web application user interface 110 to enter input 144, such as a tenant ID and search query. If the user 102 is an administration user, then input 144 may include configuration input. The search Web application user interface 110 is illustrated in greater detail in FIG. 2A, FIG. 2B, and FIG. 3, and is configured to provide a way to search and perform administrative tasks. In some aspects, the search Web application user interface 110 can be configured using programming languages such as Java, HTML, and JavaScript.

The search system 100 further includes database 116 which can be used by the search Web service API 112 to store configuration and other information used by the IACM 146, the SCM 158, or other modules or network entities within the search system 100. For example, database 116 may store repository configurations 150 (used by the SCM 158 when creating new repositories), indexing rules 152 used by indexing agents such as indexing agent 148, query log 154 of prior queries by user 102, and search parameters 156 used in connection with search queries by user 102.

The search index server 114 is configured to store indexed data (e.g., data originating from the file share servers 120, 122, . . . , 124 that has been indexed by the indexing agent 148 based on indexing rules 152). The indexing agent 148 may be executing on the at least one search indexing server 118, and the indexed data 132 may be communicated via the search Web service API 112 to the search index server 114 for storage as indexed data 140, . . . , 142 via add-to-index command 134. In some aspects, the indexed data 140, . . . , 142 includes text data from files in file repositories within the file share servers 120, ..., 124 that have been indexed, metadata associated with the originating file, a cryptographic hash of the index data, and a tenant identifier. The tenant identifier that is part of an indexed file will be the same tenant identifier associated with the indexing agent 148 that has indexed the file. In this regard, as illustrated in FIG. 1, indexed data 140, ..., 142 can be segregated by tenant so that indexed data 140, ..., 142 corresponds to tenant identifiers 1, ..., N respectively. Indexed data 140, ..., 142 may be retrieved from the search index server 114 via a query command 134 from the search Web service API 112 in connection with a search query from user 102 entered via the search Web application user interface 110.

Figure 2A:
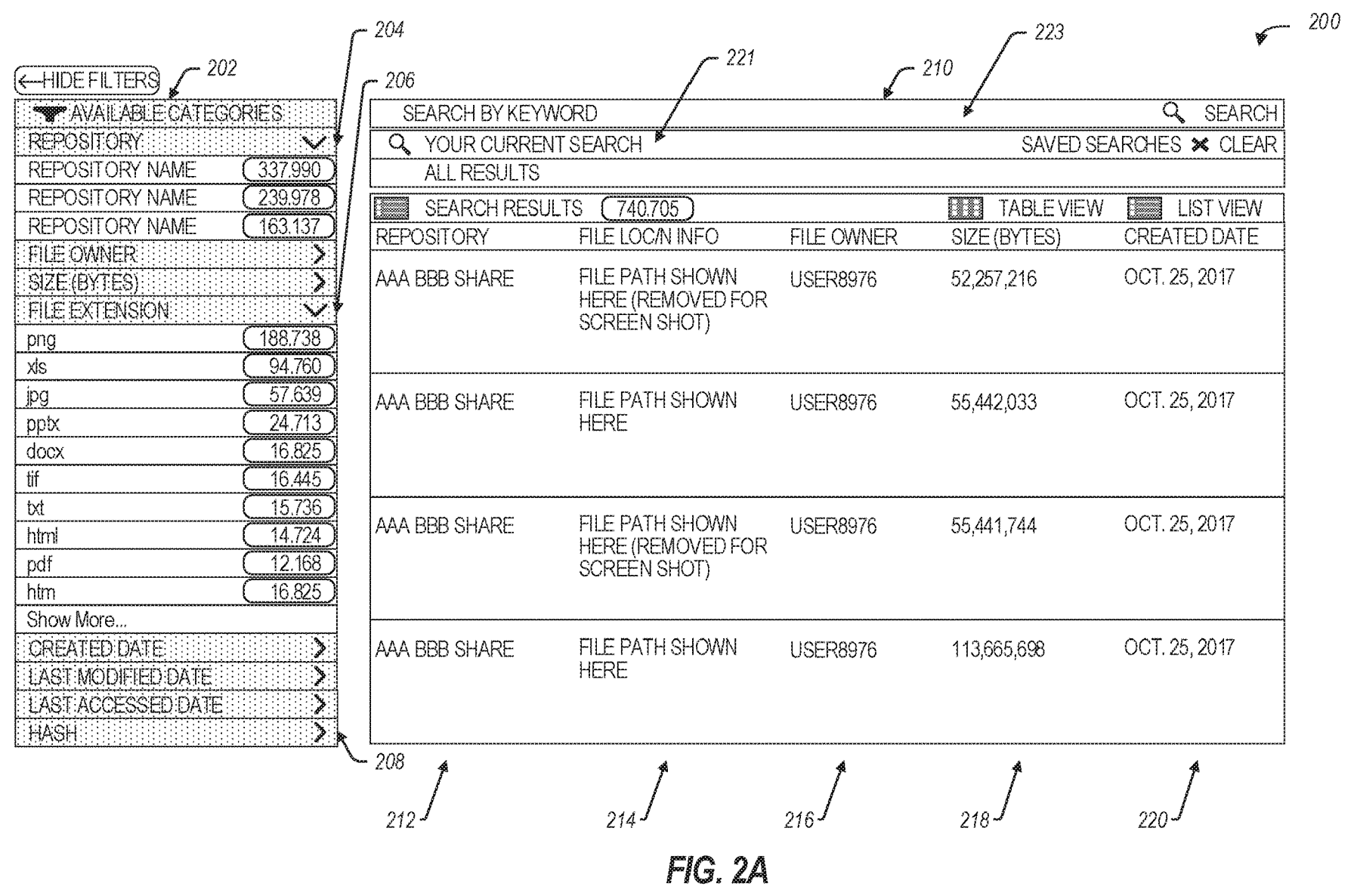

FIG. 2A and FIG. 2B illustrate example user interfaces for presenting search results by the search system of FIG. 1, in accordance with some embodiments.

Referring to FIG. 2A, the search Web application user interface 110 can be similar to the user interface 200, which may be used in connection with providing search results in response to a query from user 102. For example, user interface 200 can provide multiple categories 202 which can be used for filtering and obtaining faceted search results. More specifically, categories 202 can include search results by repository (where user 102 can select a specific repository hosted by one of the file share servers and view search results only associated with the selected repository), by file owner, by file size, by file extension 206 (if a specific file extension is selected search results of files only with the selected extension are displayed in the search results window 210), by file creation date, by last modified date, by last access date, and by a cryptographic hash 208.

As mentioned hereinabove, every indexed file can include a cryptographic hash value (e.g., a 32-digit hexadecimal hash or another size) created using an MD5 cryptographic hash algorithm (or another type of algorithm) based on the contents of the indexed file (e.g., based on the text data within the indexed file). If a hash value of one indexed file is identical to a hash value of another indexed file, then the contents of the two files can be considered identical regardless of the files' names. In this regard, the cryptographic hash 208 can be used to identify duplicate files within the search system 100.

The results window 210 includes a current search field 221 and a "search by keyword" field 223, which can be used to initiate searches of indexed data. The "search by keyword" field 223 is used for entering one or more keywords, and the search looks for these words in any of the results table fields 212-220.

In some aspects, before a search is initiated, the user may select a tenant (not illustrated in FIG. 2A and FIG. 2B but illustrated in FIG. 3), which determines which repositories and which indexed data the user can access. After the user selects a tenant identifier, additional authorization and verification may be performed to determine whether the particular user may access indexed data associated with the selected tenant identifier. In this way, the search system 100 can be configured to perform segregated searches within the same set of file share servers 120, ..., 124.

The results table fields displayed within the search results window 210 include repository identification information 212, file location information 214, file owner information 216, file size information 218, and file creation date 220. The file location information 214 can include a direct link to the file in the indicated file repository identified by the repository identification information 212, can be a local folder on a hard drive, a remote network shared folder or a URL for a network system containing indexed data.

In some aspects, the search results window 210 can include a results page selection bar 224 as well as file exporting/downloading options 222 as illustrated in FIG. 2B.

Figure 3:
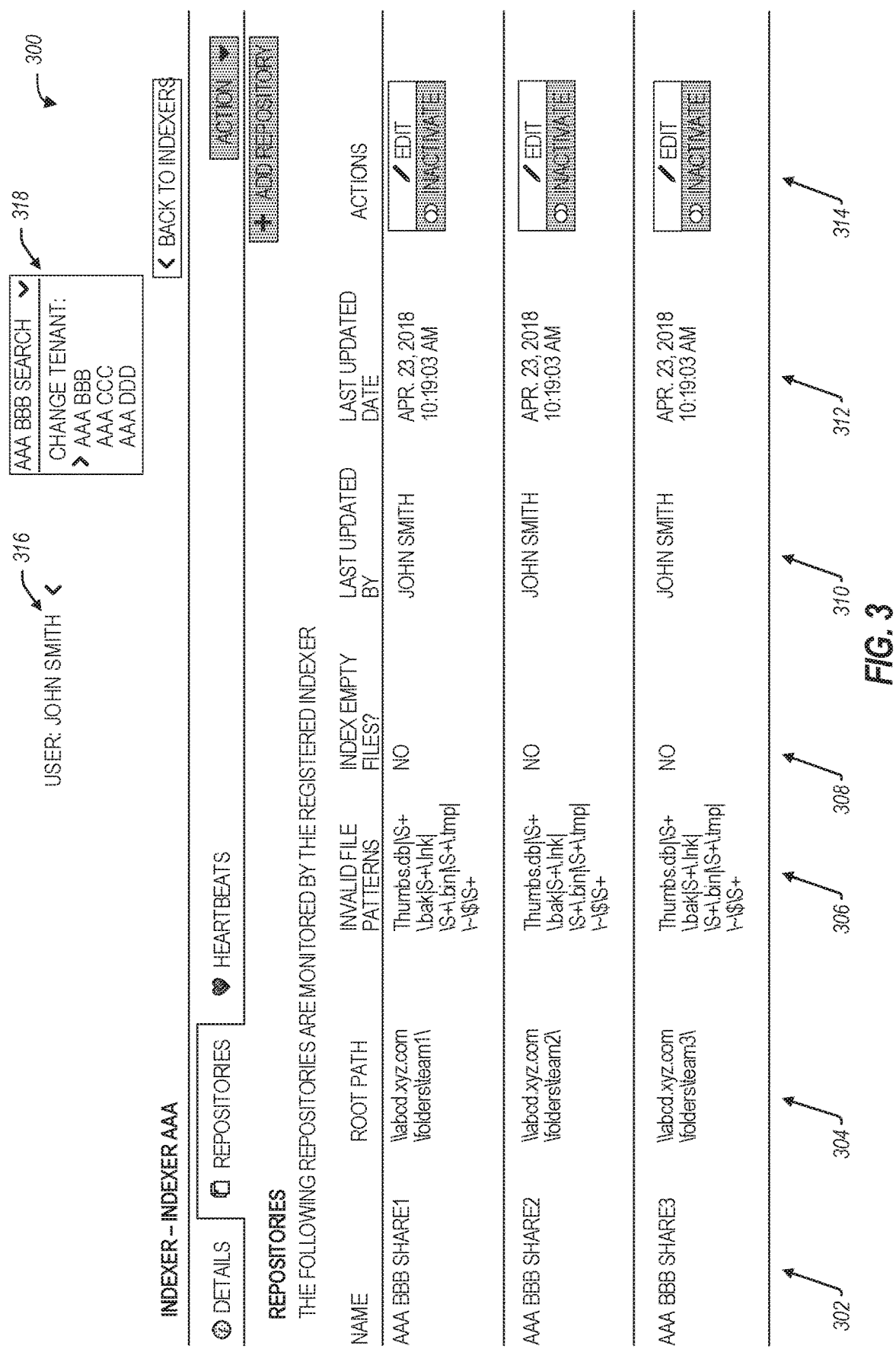
FIG. 3 illustrates an example configuration of an indexing agent that can be used by the search system of FIG. 1, in accordance with some embodiments.

FIG. 3 illustrates an example configuration of an indexing agent 300 that can be used by the search system of FIG. 1, in accordance with some embodiments. Referring to FIG. 3, the IACM 146 can retrieve user identification 316 as well as a tenant identifier selection 318. After the user and the tenant identifier are verified/authenticated, the IACM 146 can retrieve indexing rules 152 to set up indexing agent configurations 302-314 and configure indexing agent 300 for execution (e.g., on the at least one search indexing server 118).

The indexing agent configurations that are part of the indexing rules 152 can include repository identification information 302 (identifying repositories within the file share servers 120, ..., 124) that can be accessed in connection with tenant identifier 318, location information 304 (e.g., network path or other type of information that can be used by the indexing agent to access the identified repository), invalid file patterns 306 (identifying file types or extensions associated with files that should not be included when the indexing agent indexes data within the identified repository), empty files indexing identifier (indicating whether or not empty files should be included in the final indexed file when data is indexed), user identification 310 of a user that has last triggered an update of the identified repository configuration (e.g., a user that performed the last configuration change), date 312 associated with the last update, and activate/inactivate identifier 314 (a repository that is inactivated will not be included in an indexing process associated with the indexing agent 300). In this regard, the indexing agent may execute and periodically check for a new indexing repository configuration.

Figure 4A:
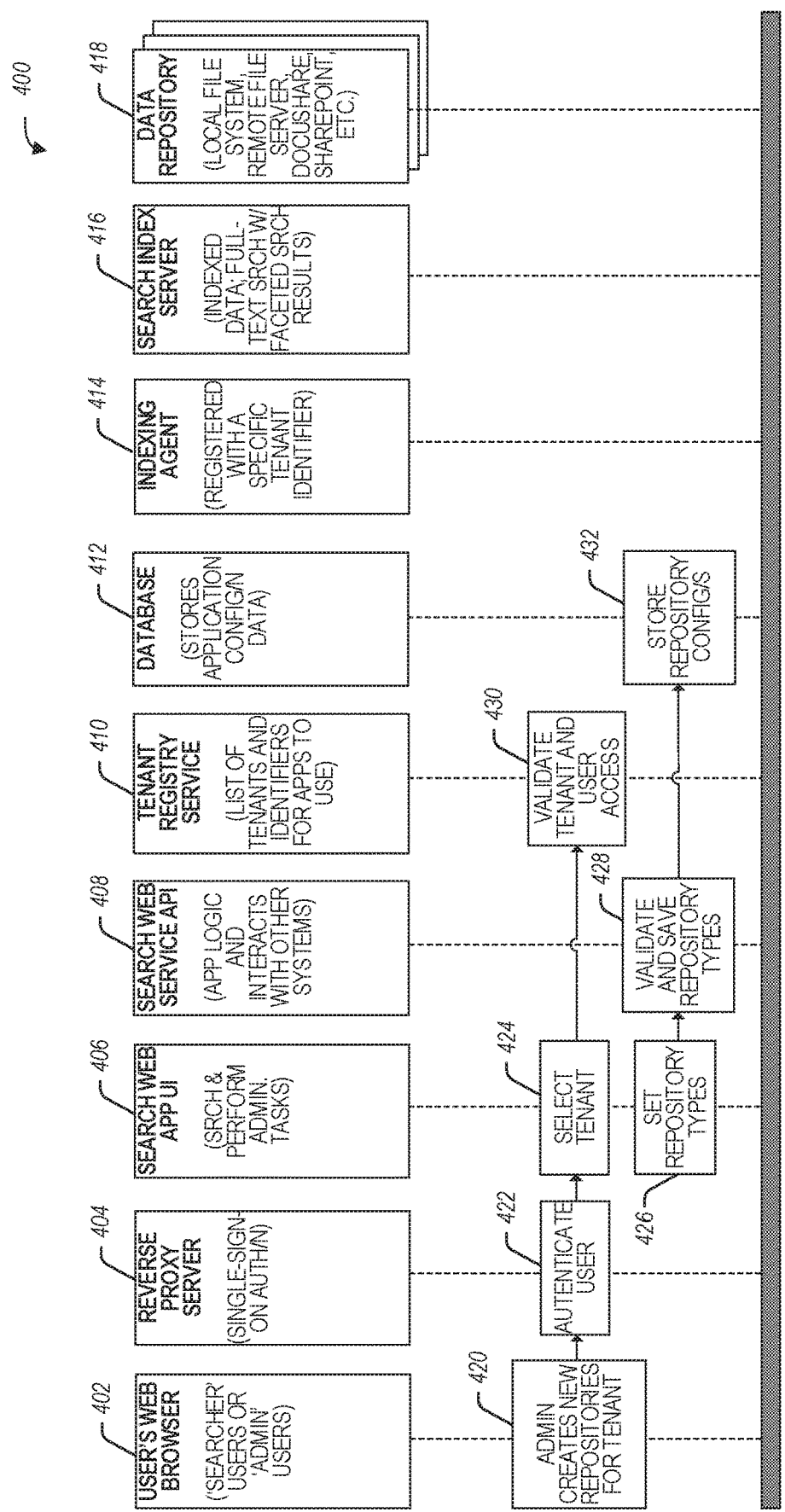
FIG. 4A illustrates a flowchart of a method for configuring one or more repositories for a tenant in connection with the search system of FIG. 1, in accordance with some embodiments.

FIG. 4A illustrates a flowchart of a method 400 for configuring one or more repositories for a tenant in connection with the search system of FIG. 1, in accordance with some embodiments. At 420, user 102 (acting as administrator) may create new repositories using the Web browser 402 (which may be the same as Web browser 104) associated with a specific tenant ID. At 422, the reverse proxy server 404 (which may be the same as proxy server 106) authenticates the user. At 424, user 102 uses search Web application user interface 406 (which may be the same as user interface 110) to select a tenant identifier. At 430, the tenant and user access may be validated by the tenant registry service 410. In some aspects, the tenant registry service 410 may be performed by the user authentication server 108, the proxy server 106, or a server executing the search Web service API 112.

At 426, the search Web application user interface 406 may be used to set one or more repository types for the created repository associate the repository with the selected tenant identifier. At 428, the search configuration module 158 of the search Web service API 112 validates saves the repository types used for the created repository as part of repository configurations 150, stored at operation 432 in database 412 (which can be the same as database 116).

Figure 4B:
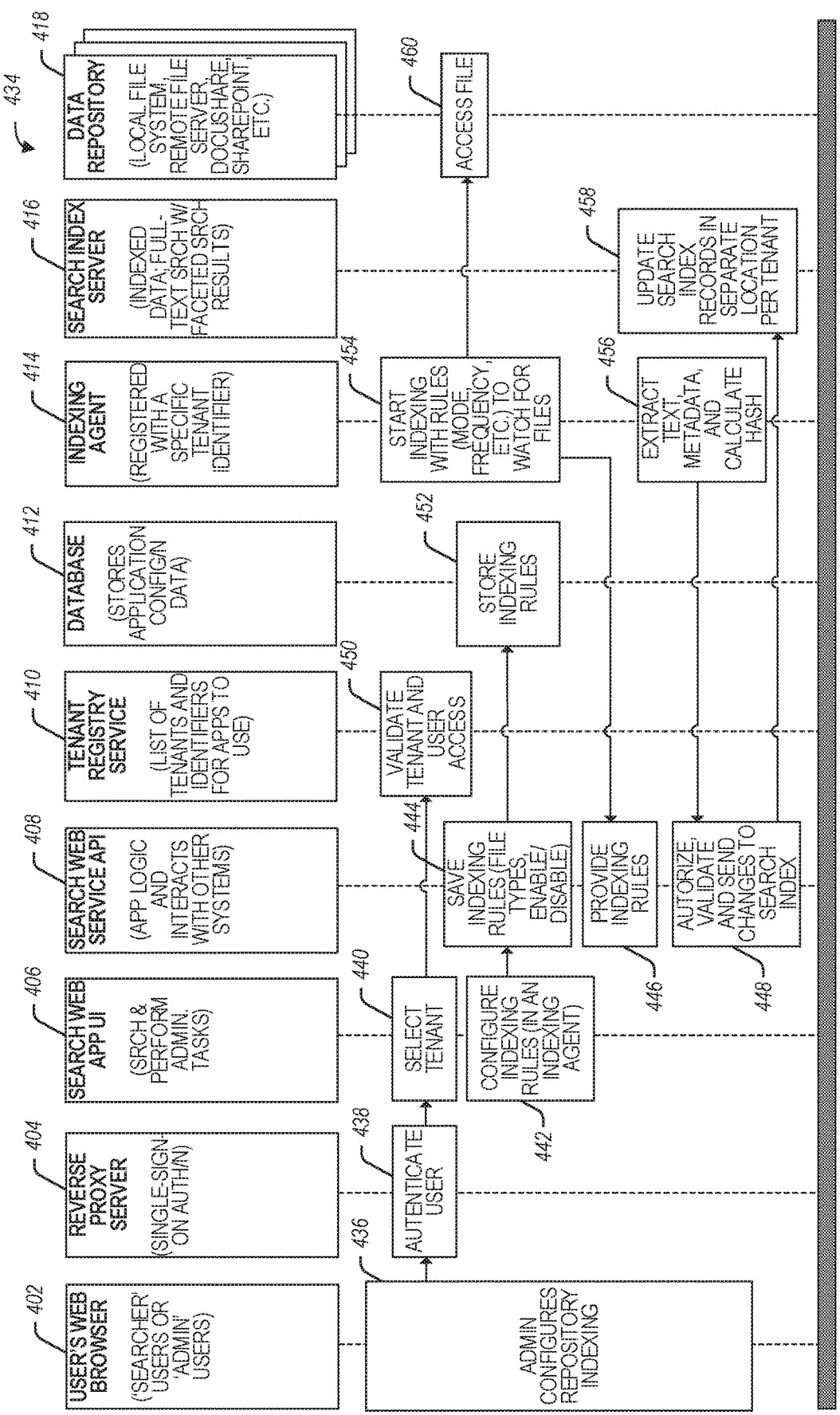
FIG. 4B illustrates a flowchart of a method for configuring repository indexing using one or more indexing agents in connection with the search system of FIG. 1, in accordance with some embodiments.

FIG. 4B illustrates a flowchart of a method 434 for configuring repository indexing using one or more indexing agents in connection with the search system of FIG. 1, in accordance with some embodiments. At 436, an administration user may initiate the configuration of repository indexing via the Web browser 402. At 438, the reverse proxy server 404 (which may be the same as proxy server 106) authenticates the user. At 440, user 102 uses search Web application user interface 406 (which may be the same as user interface 110) to select a tenant identifier. At 450, the tenant and user access may be validated by the tenant registry service 410.

At 442, indexing rules may be configured as part of the configuration of an indexing agent. For example, the search Web application user interface 406 may be used by the admin user to configure the indexing rules 152. In some aspects, the indexing rules 152 may be generated by the SCM 158 of the search Web service API 112 using preconfigured rules or settings based on the selected tenant identifier, available repositories, user identity, global indexing rules, and so forth. At 444, the indexing rules (e.g., one or more of the rules illustrated in connection with FIG. 3) are finalized and stored, at operation 452, as indexing rules 152 in database 412 (which is the same as database 116).

At 454, the IACM 146 may deploy the indexing agent 148 (e.g., at the at least one search indexing server 118) and may cause the indexing agent 148 to start indexing with indicated set the indexing rules which may be part of indexing rules 152. At 446, the indexing agent 148 may perform a pull operation and obtain the indexing rules via the IACM 146, which may retrieve the indexing rules 152 from database 412 (or 116) and provider the rules to the indexing agent to initiate indexing. At 460, the indexing agent 148 accesses files (associated with the tenant ID previously selected and associated with the indexing agent) in the data repository 418 (which can include filesharing servers 120, . . . , 124). At 456, the indexing agent 148 start indexing the accessed files to extract text data, metadata, calculate the cryptographic hash based on the extracted text data. The indexed data, including the text data, the metadata, and the cryptographic hash are communicated back to the search Web service API 112. At 448, the search Web service API 112 (e.g., IACM 146 or SCM 158) authorizes and validates the received indexed data (e.g., validates the indexed data is associated with the selected tenant identifier) and upon successful authorization/validation, communicates the indexed data to the search index server 416 (which can be the same as the search index server 114). At 458, the search index server updates the search index (e.g., indexed data 140, . . . , 142) using the received indexed data (e.g., stores the received indexed data in one of the storage locations storing indexed data 140, . . . , 142, based on the tenant identifier of the received indexed data).

Figure 4C:
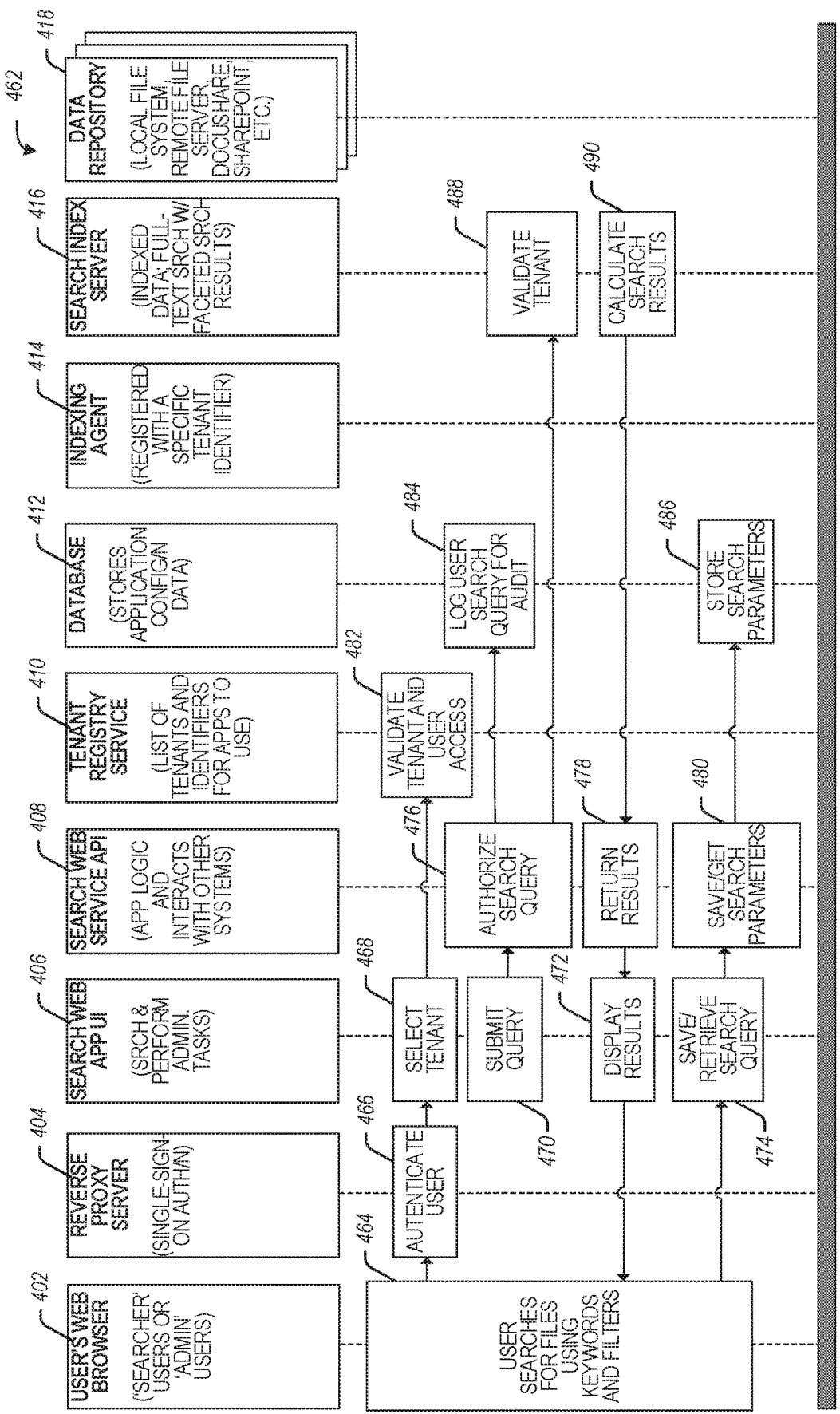
FIG. 4C illustrates a flowchart of a method for searching indexed repositories based on a tenant identifier and a search query in connection with the search system of FIG. 1, in accordance with some embodiments.

FIG. 4C illustrates a flowchart of a method 462 for searching indexed repositories based on a tenant identifier and a search query in connection with the search system of FIG. 1, in accordance with some embodiments. At 464, a searching user may initiate a search using keywords and filters (e.g., using the interface illustrated in FIGS. 2A-2B). At 466, the reverse proxy server 404 (which may be the same as proxy server 106) authenticates the user. At 468, user 102 uses search Web application user interface 406 (which may be the same as user interface 110) to select a tenant identifier. At 482, the tenant and user access may be validated by the tenant registry service 410.

At 470, a search query may be submitted via the search Web application user interface 406. At 476, the search Web service API 112 may use the SCM 158 to authorize the search query (e.g., verify whether the indicated tenant identifier is authorized to access indexed data indicated by the query or indexed data that may have to be accessed in order to execute the query). At 484, SCM 158 may log the user search query for subsequent audit in the query log 154 in database 412.

At 488, the search index server 416 validates the tenant identifier in connection with the received query, and at 490, calculates the search results using the indexed data 140, . . . , 142 that is associated with the indicated tenant identifier. At 478, the search results are returned by the search Web service API 408, and at 472, the search results are displayed by the search Web application user interface 406.

At 474, the search Web application user interface 406 may be used to say or retrieve a search query. At 480, the search Web service API 408 may save or retrieve search parameters associated with the query, and at 486, based on the search parameters as parameters 156 in the database 412.

As used herein, the term "search parameters" indicates filters or categories that are used to reduce the results to only match some categories in the search index. For instance, a user may look for only "JPG" image types, which may be considered as a search parameter in this context.

As used herein, "search query" indicates a term that a user provides to use in submitting a search request. In this regard, a query of "cat" when combined with a filter of "JPG" would show photo files (JPG files) that would have the word "cat" in the file name or in the embedded file metadata.

Figure 4D:
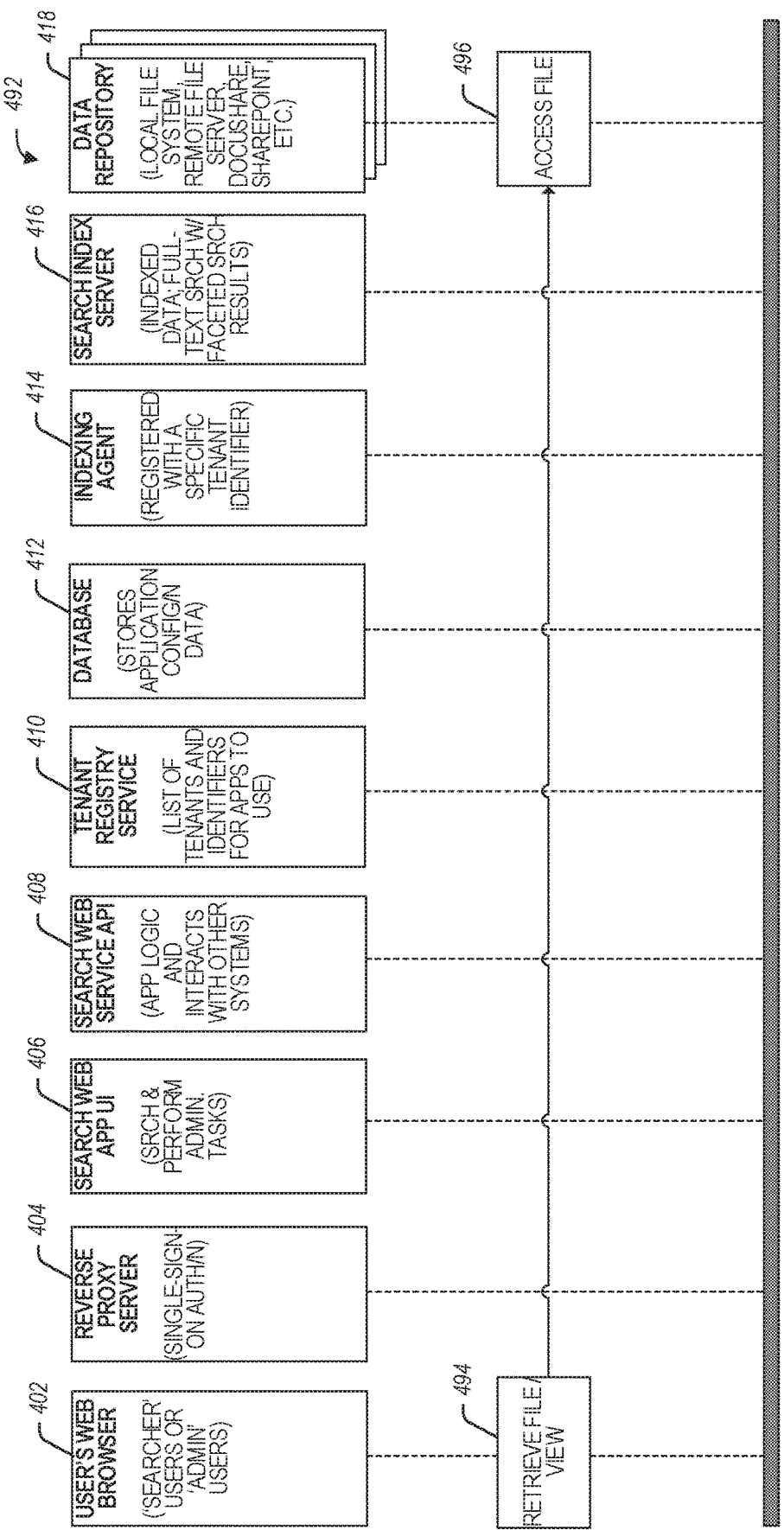
FIG. 4D illustrates a flowchart of a method for retrieving and viewing indexed data from a repository using location information provided in search results in connection with the search system of FIG. 1, in accordance with some embodiments.

FIG. 4D illustrates a flowchart of a method 492 for retrieving and viewing indexed data from a repository using location information provided in search results in connection with the search system of FIG. 1, in accordance with some embodiments. Referring to FIG. 2A, FIG. 2B, and FIG. 4D, at 494, user 102 may use the Web browser 402 and the interface 406 to access a file, at 496, in data repository 418 using the corresponding location information 214 indicated in the search results window 210, and view the accessed file.

Even though FIG. 1 illustrates search system 100 is using multiple servers and operating in a distributed manner, the disclosure is not limited in this regard and multiple functions may be consolidated and performed within a single server (e.g., a server hosting the search Web service API 112). In this regard, the indexing agent 148 may be executed from such a server to access an index data stored in the file share servers 120, . . . , 124.

In some aspects, the indexing agent 148 in the search system 100 is configured (e.g., by the IACM 146) as multi-mode, for periodic re-indexing of updates or live, near-real time updates of new, updated, moved or deleted files. More specifically, the indexing agent 148 is configured to execute in one of two modes:

(a) Near-real-time mode: the indexing agent may use an active file watcher to observe the file system (e.g., 120, . . . , 124) and detect changes, which notify the indexing agent 148 through events to update, remove, or add contents and metadata from the changed file; and (b) Polling mode: the indexing agent uses a periodic timer (e.g., every 5-60 minutes) to traverse through the file system and detect changes since the last time indexing was performed.

In some aspects, the IACM 146 configures the indexing agent 148 to enables indexing of files in remote tools (e.g. DocuShare™, SharePoint™, and FTP servers). More specifically, the indexing agents 148 can be configured to monitor and index file systems in various data storage repositories. In some aspects, the indexing agent can be a file system agent that monitors local and remote Network File Service (NFS) shared storage devices on the network. In some aspects, the indexing agent can be configured to monitor files in Xerox DocuShare systems. In some aspects, the indexing agent can be configured to monitor/index other file locations, such as remote servers over FTP, or software platforms such as DocuShare. This provides a centralized way to search across heterogeneous platforms and technologies and identify files within seconds and find duplicate files or files with desired keywords.

In some aspects, the search system 100 may be configured as a scalable multi-tier, agent-based system architecture, which can index data from local and remote machines to a centralized and secured faceted search repository. More specifically, the functionalities of the search Web service API 112 may be used for processing/managing small and large data volumes through scaling the infrastructure as needed at any layer: the search Web application user interface 110, the search Web service API 112, the search index server 114, the database 116, and the indexing agents (e.g., 148).

In some aspects, the search Web application user interface 110 takes end-user searches and passes them to the search Web service API 112, which calls the indexed data (140, . . . , 142) at the search index server 114 and returns the results of the query along with metadata about the results and available subgroupings.

In some aspects, the search system 100 is configured for on-the-fly configurable selective indexing of file types. More specifically, the IACM 146 can configure indexing agents in a centralized management console to only index files with specific filename patterns and to ignore files that are empty (e.g., files that contain 0 bytes).

In some aspects, the search system 100 may be deployable via indexing agents on any operating system to machines located anywhere with a network. In this regard, the indexing agents can be executed on any operating system (e.g., in some aspects, an operating system supporting the Java Virtual Machine) and has connectivity to the indexing service API 112 over HTTP.

In some aspects, the indexing agents of the search system 100 may be configured to index and search the metadata and textual file contents inside a large number of file formats, including compressed files (e.g., ZIP forma files). More specifically, the indexing agent can obtain text data contained in differently formatted files, including compressed files, which often contain several independent files.

In some aspects, the search Web service API 112 in the search system 100 can be configured to indicate duplicate files across machines or repositories using the cryptographic hashes generated as part of indexing. As previously explained, a unique cryptographic hash from the contents of each file is generated and may be used for detecting duplicate files, regardless of file name or location within local or remote repositories for a given tenant identifier.

In some aspects, the multi-tenancy aspect of the search system 100 (e.g., segregation and access of indexed data based on a tenant identifier) allows separate user teams to use the same search system instance with separate access control lists due to full-tier data segregation (e.g., similar to a Cloud SaaS model). The search system 100 is built with the concept of multitenancy, which means that the same software can be utilized by many independent teams without replicating the instances of the software or supporting infrastructure. More specifically, the proxy server 106, the search Web service API 112, the database 116, the search index server 114, and the at least one search indexing server 118 are all configured to use a consistent list of "tenants" (associated with tenant identifiers) which represent independent teams whose data may need to be kept isolated/segregated. Each team may use their own access list to maintain and a list of repositories that are indexed through corresponding indexing agents associated with the specific tenant identifier(s) of the team.

Figure 5:
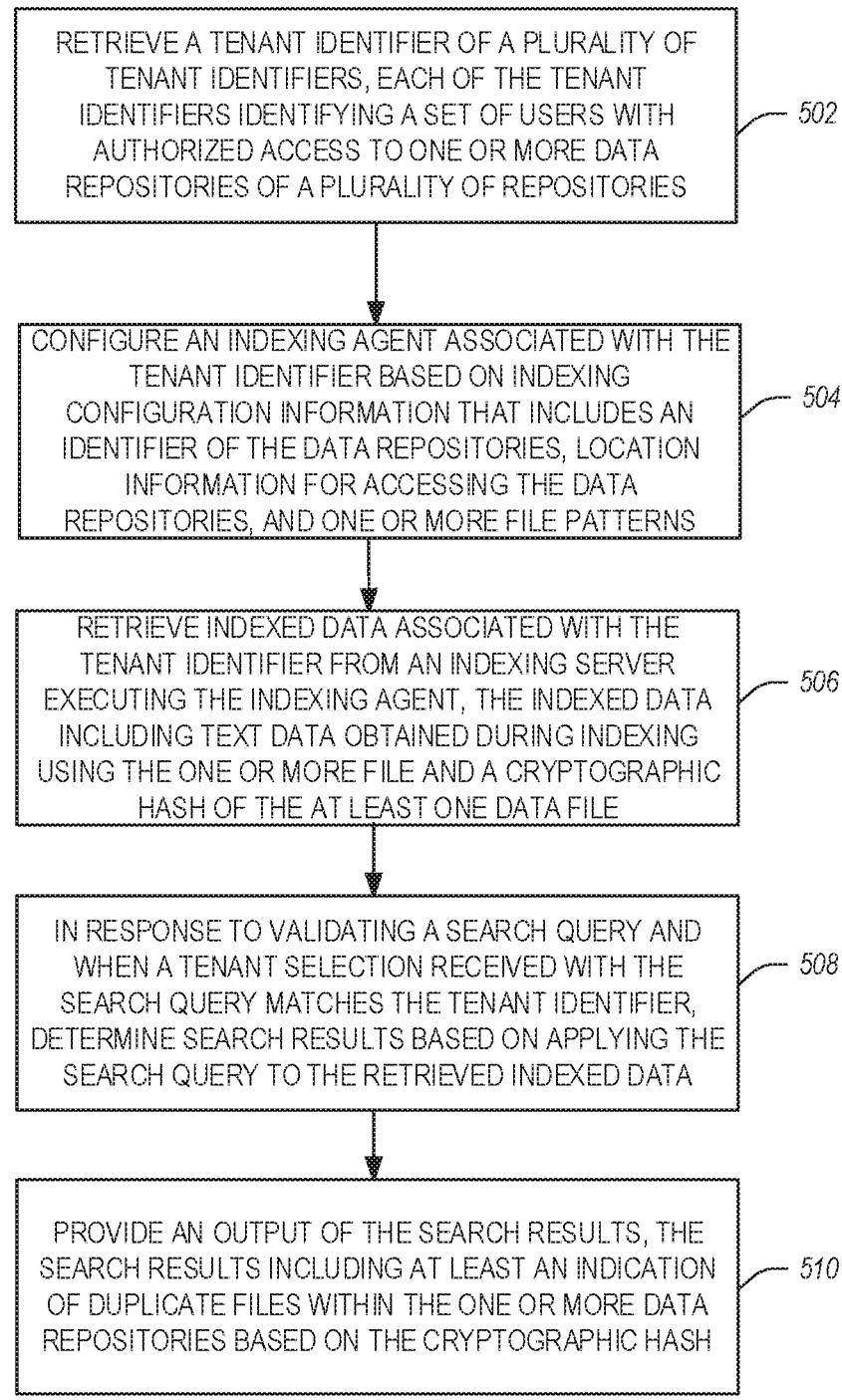
FIG. 5 illustrates a flowchart of a method for configuring a search system using an indexing agent associated with a tenant identifier, in accordance with some embodiments.

FIG. 5 illustrates a flowchart of a method 500 for configuring a search system using an indexing agent associated with a tenant identifier, in accordance with some embodiments. The method 500 includes operations 502, 504, 506, 508, and 510. By way of example and not limitation, the method 500 may be performed by the search Web service API 112, including IACM 146 and SCM 158, which may be configured to execute within a computing device such as device 700 illustrated in FIG. 7.

At operation 502, a tenant identifier of a plurality of tenant identifiers is retrieved. Each of the plurality of tenant identifiers identifies a set of users with authorized access to one or more data repositories of a plurality of data repositories (e.g., 120, . . . , 124). For example, after a user 102 enters search information 138 which may include user identity and tenant identifiers selection, the user and the tenant identifier are validated and the search Web service API 112 can access the validated tenant identifier provided by the user.

At operation 504, an indexing agent associated with the tenant identifier is configured based on indexing configuration information. For example, the IACM 146 can configure an indexing agent 148 using indexing configuration information such as indexing rules 152. The indexing configuration information (e.g., indexing rules 152) may include at least an identifier of the one or more data repositories (e.g. 302), location information (e.g., 304) for accessing the one or more data repositories, and one or more file patterns (e.g., 306).

At operation 506, indexed data associated with the tenant identifier may be retrieved from an indexing server executing the indexing agent. For example, the at least one search indexing server 118 may execute the indexing agent 148 to generate indexed data (e.g., 132). The indexed data may include text data obtained by the indexing agent during indexing using at least one data file associated with the one or more file patterns and stored in the one or more data repositories, and a cryptographic hash of the at least one data file.

At operation 508, in response to validating a received search query is associated with a user of the set of users authorized to access the one or more data repositories and a tenant selection received with the search query matches the tenant identifier, search results are determined based on applying the search query to the retrieved indexed data. For example and as illustrated in FIG. 4C, a tenant may enter a search query along with a tenant identifier. After the tenant identifier is validated in connection with the query, such service API 12 executes the query via command 134 using the indexed data 140, . . . , 142.

At operation 510, an output of the search results is provided. For example, validated search results may be communicated back and presented via the search Web application user interface 110. The search results (e.g., as illustrated in FIG. 2A and FIG. 2B) may include at least an indication of duplicate files within the one or more data repositories based on the cryptographic hash.

Figure 6:
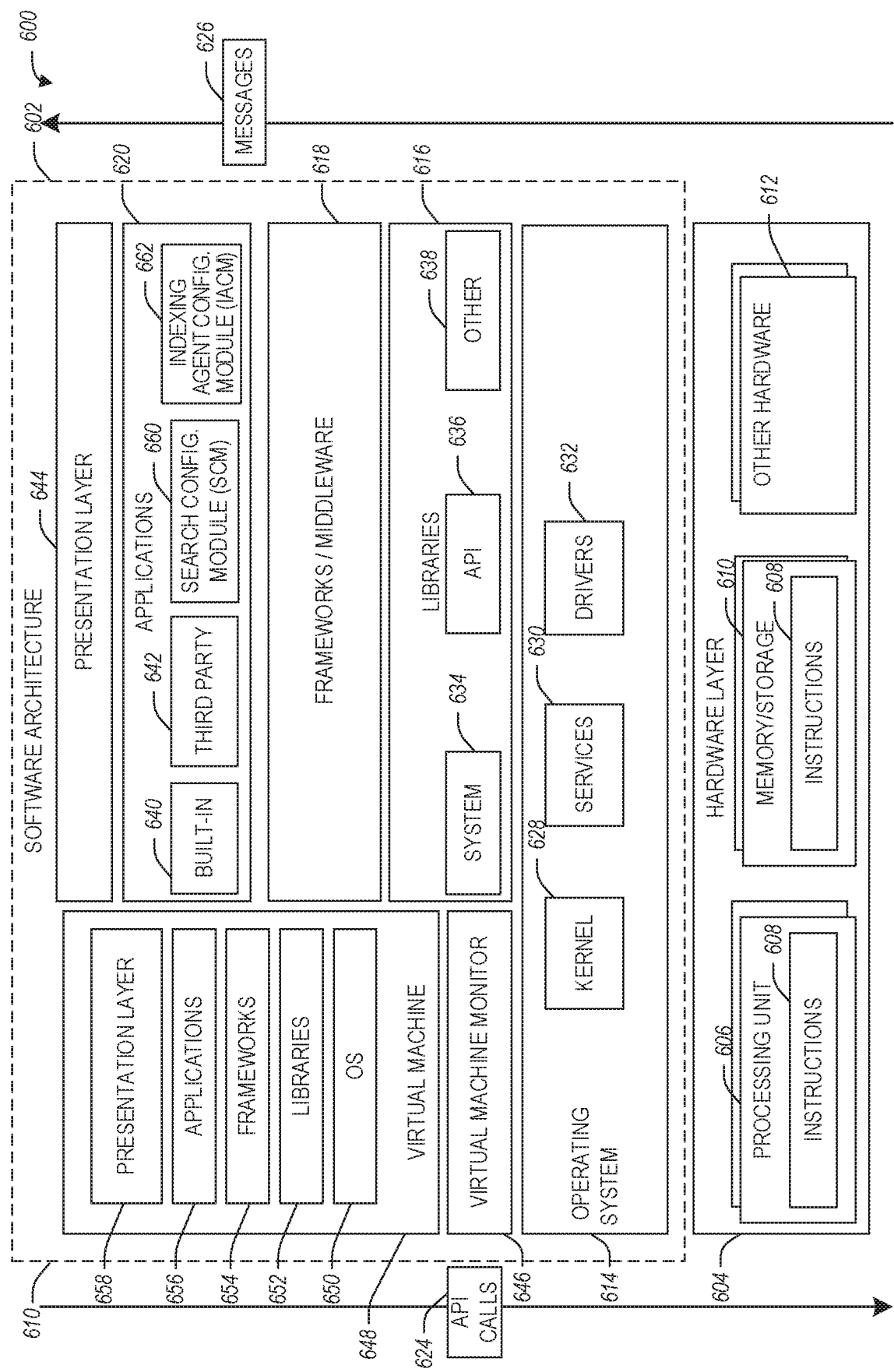
FIG. 6 is a block diagram illustrating a representative software architecture, which may be used in conjunction with various device hardware described herein, in accordance with some embodiments.

FIG. 6 is a block diagram illustrating a representative software architecture 600, which may be used in conjunction with various device hardware described herein, according to some example embodiments. FIG. 6 is merely a non-limiting example of a software architecture 602 and it will be appreciated that many other architectures may be implemented to facilitate the functionality described herein. The software architecture 602 may be executing on hardware such as device 700 of FIG. 7 that includes, among other things, processor 705, memory 710, storage 715 and 720, and I/O interfaces 725 and 730.

Figure 7:
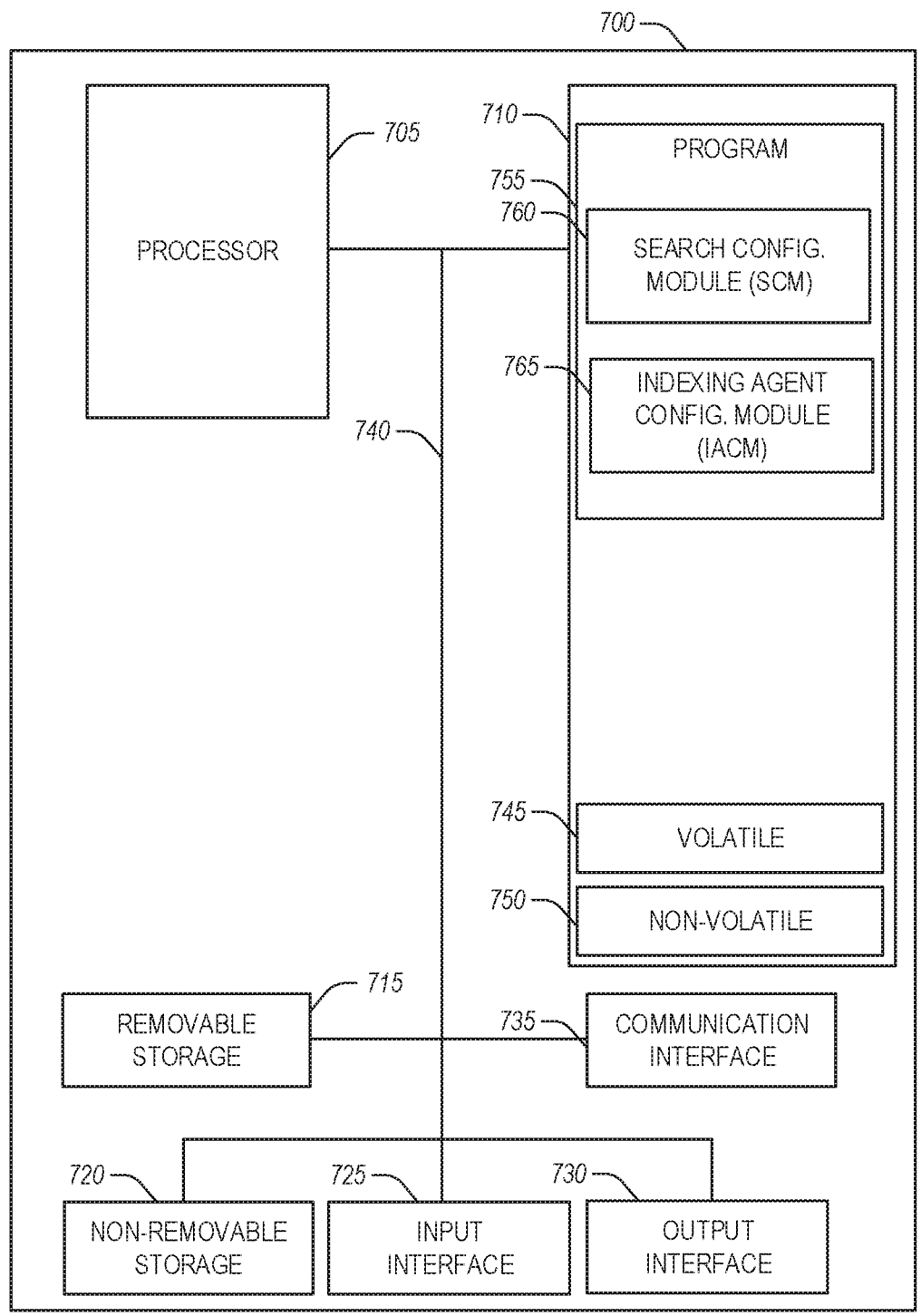
FIG. 7 is a block diagram illustrating circuitry for a device that implements algorithms and performs methods, in accordance with some embodiments.

A representative hardware layer 604 is illustrated and can represent, for example, the device 700 of FIG. 7. The representative hardware layer 604 comprises one or more processing units 606 having associated executable instructions 608. Executable instructions 608 represent the executable instructions of the software architecture 602, including implementation of the methods, modules and so forth of FIGS. 1-5. Hardware layer 604 also includes memory or storage modules 610, which also have executable instructions 608. Hardware layer 604 may also comprise other hardware 612, which represents any other hardware of the hardware layer 604, such as the other hardware illustrated as part of device 700.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and presentation layer 644. Operationally, the applications 620 or other components within the layers may invoke application programming interface (API) calls 624 through the software stack and receive a response, returned values, and so forth illustrated as messages 626 in response to the API calls 624. The layers illustrated in FIG. 6 are representative in nature and not all software architectures 602 have all layers. For example, some mobile or special purpose operating systems may not provide frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 616 may provide a common infrastructure that may be utilized by the applications 620 or other components or layers. The libraries 616 typically provide functionality that allows other software modules to perform tasks in an easier fashion than to interface directly with the underlying operating system 614 functionality (e.g., kernel 628, services 630, or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), Web libraries (e.g., WebKit that may provide Web browsing functionality), and the like. The libraries 616 may also include a wide variety of other libraries 638 to provide many other APIs to the applications 620 and other software components/modules.

The frameworks/middleware 618 (also sometimes referred to as middleware) may provide a higher-level common infrastructure that may be utilized by the applications 620 or other software components/modules. For example, the frameworks/middleware 618 may provide various graphical user interface (GUI) functions, high-level resource management, high-level location services, and so forth. The frameworks/middleware 618 may provide a broad spectrum of other APIs that may be utilized by the applications 620 or other software components/modules, some of which may be specific to a particular operating system 614 or platform.

The applications 620 include built-in applications 640, third-party applications 642, a search configuration module (SCM) 660, and an indexing agent configuration module (IACM) 662. In some aspects, the SCM 660 comprises suitable circuitry, logic, interfaces, or code and is configured to perform one or more of the functionalities associated with the SCM 158 of FIG. 1 and discussed in connection with FIGS. 1-5. In some aspects, the IACM 662 comprises suitable circuitry, logic, interfaces, or code and is configured to perform one or more of the indexing agent configuration functionalities associated with the IACM 146 of FIG. 1 and discussed in connection with FIGS. 1-5.

Examples of representative built-in applications 640 may include but are not limited to, a contacts application, a browser application, a book reader application, a location application, a media application, a messaging application, or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630, and drivers 632), libraries (e.g., system libraries 634, API libraries 636, and other libraries 638), and frameworks/middleware 618 to create user interfaces to interact with users of the system. Alternatively, or additionally, in some systems, interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware machine (such as the device 700 of FIG. 7, for example). A virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture 602 executes within the virtual machine 648 such as an operating system 650, libraries 652, frameworks/middleware 654, applications 656, or presentation layer 658. These layers of software architecture executing within the virtual machine 648 can be the same as corresponding layers previously described or may be different.

FIG. 7 is a block diagram illustrating circuitry for a device that implements algorithms and performs methods, according to some example embodiments. All components need not be used in various embodiments. For example, clients, servers, and cloud-based network devices may each use a different set of components, or in the case of servers, for example, larger storage devices.

One example computing device in the form of a computer 700 (also referred to as computing device 700, computer system 700, or computer 700) may include a processor 705, memory 710, removable storage 715, non-removable storage 720, input interface 725, output interface 730, and communication interface 735, all connected by a bus 740. Although the example computing device is illustrated and described as the computer 700, the computing device may be in different forms in different embodiments.

The memory 710 may include volatile memory 745 and non-volatile memory 750 and may store a program 755. The computing device 700 may include—or have access to a computing environment that includes—a variety of computer-readable media, such as the volatile memory 745, the non-volatile memory 750, the removable storage 715, and the non-removable storage 720. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 755 stored in the memory 710) are executable by the processor 705 of the computing device 700. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

The program 755 may utilize a customer preference structure using modules discussed herein, such as the SCM 760 and the IACM 765, which may be the same as the SCM 660 and the IACM 662 of FIG. 6 respectively.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, the SCM 760, the IACM 765, as well as one or more other modules that are part of the program 755, can be integrated as a single module, performing the corresponding functions of the integrated modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of the steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled," and variations thereof, are not restricted to physical or mechanical connections or couplings. Further, terms such as up, down, bottom, and top are relative, and are employed to aid illustration, but are not limiting.

The components of the illustrative devices, systems, and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

It should be appreciated that where software is described in a particular form (such as a component or module) this is merely to aid understanding and is not intended to limit how software that implements those functions may be architected or structured. For example, modules are illustrated as separate modules but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

A computer program can be written in any form of programming language, including compiled or interpreted languages, and it can be deployed in any form, including as a stand-alone program or as a module, component, subroutine, or other units suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, or data storage disks (e.g., magnetic disks, internal hard disks, or removable disks, magneto-optical disks, or CD-ROM/DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") comprises a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium or a combination of multiple media, that is capable of storing instructions for execution by one or more processors, such that the instructions, when executed by one or more processors, cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Additional Examples and Embodiments

Example 1 is a computer-implemented method, the method comprising: retrieving a tenant identifier of a plurality of tenant identifiers, each of the plurality of tenant identifiers identifying a set of users with authorized access to one or more data repositories of a plurality of data repositories; configuring an indexing agent associated with the tenant identifier based on indexing configuration information, the indexing configuration information including at least an identifier of the one or more data repositories, location information for accessing the one or more data repositories, and one or more file patterns; retrieving indexed data associated with the tenant identifier from an indexing server executing the indexing agent, the indexed data including text data obtained by the indexing agent during indexing using at least one data file associated with the one or more file patterns and stored in the one or more data repositories, and a cryptographic hash of the at least one data file; in response to validating a received search query is associated with a user of the set of users authorized to access the one or more data repositories and a tenant selection received with the search query matches the tenant identifier, determining search results based on applying the search query to the retrieved indexed data; and providing an output of the search results, the search results including at least an indication of duplicate files within the one or more data repositories based on the cryptographic hash.

In Example 2, the subject matter of Example 1 includes, configuring the indexing agent to execute automatically on the indexing server in one of a plurality of indexing modes.

In Example 3, the subject matter of Example 2 includes, wherein a first indexing mode of the plurality of indexing modes includes: a near real-time execution mode where the indexing agent is configured to monitor the one or more data repositories in real-time for changes in the at least one data file since a prior indexing, and re-index the at least one data file upon detecting the changes.

In Example 4, the subject matter of Example 3 includes, wherein a second indexing mode of the plurality of indexing modes includes: a polling execution mode where the indexing agent is configured to periodically determine whether the at least one data file includes the changes since the prior indexing, and perform the re-index upon detecting the changes.

In Example 5, the subject matter of Examples 1-4 includes, wherein the indexed data further includes the tenant identifier and metadata of the at least one data file.

In Example 6, the subject matter of Example 5 includes, storing the indexed data with the tenant identifier in a storage location associated with the tenant identifier.

In Example 7, the subject matter of Examples 1-6 includes, configuring the search results to include an access link to at least one of the data files satisfying the search query, the access link associated with a data repository of the plurality of data repositories that contains the at least one of the data files.

In Example 8, the subject matter of Examples 1-7 includes, configuring the indexing agent with an empty-file indicator within the indexing configuration information, wherein the indexing agent skips or includes empty files when generating the indexed data based on the empty-file indicator.

In Example 9, the subject matter of Examples 1-8 includes, wherein the one or more file patterns include an indication of a file type that the indexing agent omits when generating the indexed data.

In Example 10, the subject matter of Examples 1-9 includes, wherein the indexing configuration information further includes an activation indicator for each of the one or more data repositories, the activation indicator indicating whether a data repository will be included in the indexing.

Example 11 is a computing device, the computing device comprising: a processor; and a memory, comprising instructions, which when executed by the processor, cause the processor to perform operations comprising: retrieving a tenant identifier of a plurality of tenant identifiers, each of the plurality of tenant identifiers identifying a set of users with authorized access to one or more data repositories of a plurality of data repositories; configuring an indexing agent associated with the tenant identifier based on indexing configuration information, the indexing configuration information including at least an identifier of the one or more data repositories, location information for accessing the one or more data repositories, and one or more file patterns; retrieving indexed data associated with the tenant identifier from an indexing server executing the indexing agent, the indexed data including text data obtained by the indexing agent during indexing using at least one data file associated with the one or more file patterns and stored in the one or more data repositories, and a cryptographic hash of the at least one data file; in response to validating a received search query is associated with a user of the set of users authorized to access the one or more data repositories and a tenant selection received with the search query matches the tenant identifier, determining search results based on applying the search query to the retrieved indexed data; and providing an output of the search results, the search results including at least an indication of duplicate files within the one or more data repositories based on the cryptographic hash.

In Example 12, the subject matter of Example 11 includes, wherein executing the instructions further cause the processor to perform operations comprising: configuring the indexing agent to execute automatically on the indexing server in one of a plurality of indexing modes.

In Example 13, the subject matter of Example 12 includes, wherein a first indexing mode of the plurality of indexing modes includes: a near real-time execution mode where the indexing agent is configured to monitor the one or more data repositories in real-time for changes in the at least one data file since a prior indexing, and re-index the at least one data file upon detecting the changes.

In Example 14, the subject matter of Example 13 includes, wherein a second indexing mode of the plurality of indexing modes includes: a polling execution mode where the indexing agent is configured to periodically determine whether the at least one data file includes the changes since the prior indexing, and perform the re-index upon detecting the changes.

In Example 15, the subject matter of Examples 11-14 includes, wherein the indexed data further includes the tenant identifier and metadata of the at least one data file.

In Example 16, the subject matter of Example 15 includes, wherein executing the instructions further cause the processor to perform operations comprising: storing the indexed data with the tenant identifier in a storage location associated with the tenant identifier.

Example 17 is a non-transitory computer-readable storage medium that stores instructions for execution by one or more processors of a computing device, the instructions to configure the one or more processors to: retrieve a tenant identifier of a plurality of tenant identifiers, each of the plurality of tenant identifiers identifying a set of users with authorized access to one or more data repositories of a plurality of data repositories; configure an indexing agent associated with the tenant identifier based on indexing configuration information, the indexing configuration information including at least an identifier of the one or more data repositories, location information for accessing the one or more data repositories, and one or more file patterns; retrieve indexed data associated with the tenant identifier from an indexing server executing the indexing agent, the indexed data including text data obtained by the indexing agent during indexing using at least one data file associated with the one or more file patterns and stored in the one or more data repositories, and a cryptographic hash of the at least one data file; in response to validating a received search query is associated with a user of the set of users authorized to access the one or more data repositories and a tenant selection received with the search query matches the tenant identifier, determine search results based on applying the search query to the retrieved indexed data; and provide an output of the search results, the search results including at least an indication of duplicate files within the one or more data repositories based on the cryptographic hash.

In Example 18, the subject matter of Example 17 includes, wherein the instructions further configure the one or more processors to configure the search results to include an access link to at least one of the data files satisfying the search query, the access link associated with a data repository of the plurality of data repositories that contain the at least one of the data files.

In Example 19, the subject matter of Examples 17-18 includes, wherein the instructions further configure the one or more processors to configure the indexing agent with an empty-file indicator within the indexing configuration information, wherein the indexing agent skips or includes empty files when generating the indexed data based on the empty-file indicator.

In Example 20, the subject matter of Examples 17-19 includes, wherein the indexing configuration information further includes an activation indicator for each of the one or more data repositories, the activation indicator indicating whether a data repository will be included in the indexing.

In some aspects, the activation indicator also determines whether files from the given repository will be includes in the search results. In a scenario where a repository is activated and, e.g., 100 files were indexed, then the repository is inactivated, the 100 files will not be included in the search results, even if they were included in search results prior to the repository being inactivated.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although embodiments have been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. A computer-implemented method, the method comprising:
retrieving a tenant identifier of a plurality of tenant identifiers, each of the plurality of tenant identifiers identifying a set of users with authorized access to one or more data repositories of a plurality of data repositories;
configuring an indexing agent associated with the tenant identifier based on indexing configuration information, the indexing configuration information including at least an identifier of the one or more data repositories, location information for accessing the one or more data repositories, and one or more file patterns;

retrieving indexed data associated with the tenant identifier from an indexing server executing the indexing agent, the indexed data including text data obtained by the indexing agent during indexing using at least one data file associated with the one or more file patterns and stored in the one or more data repositories, and a cryptographic hash of the at least one data file;

in response to validating a received search query is associated with a user of the set of users authorized to access the one or more data repositories and a tenant selection received with the search query matches the tenant identifier, determining search results based on applying the search query to the retrieved indexed data; and providing an output of the search results, the search results including at least an indication of duplicate files within the one or more data repositories based on the cryptographic hash.

2. The method of claim 1, further comprising:
configuring the indexing agent to execute automatically on the indexing server in one of a plurality of indexing modes.

3. The method of claim 2, wherein a first indexing mode of the plurality of indexing modes includes:
a near real-time execution mode where the indexing agent is configured to monitor the one or more data repositories in real-time for changes in the at least one data file since a prior indexing, and re-index the at least one data file upon detecting the changes.

4. The method of claim 3, wherein a second indexing mode of the plurality of indexing modes includes:
a polling execution mode where the indexing agent is configured to periodically determine whether the at least one data file includes the changes since the prior indexing, and perform the re-index upon detecting the changes.

5. The method of claim 1, wherein the indexed data further includes the tenant identifier and metadata of the at least one data file.

6. The method of claim 5, further comprising:
storing the indexed data with the tenant identifier in a storage location associated with the tenant identifier.

7. The method of claim 1, further comprising:
configuring the search results to include an access link to at least one of the data files satisfying the search query, the access link associated with a data repository of the plurality of data repositories that contains the at least one of the data files.

8. The method of claim 1, further comprising:
configuring the indexing agent with an empty-file indicator within the indexing configuration information, wherein the indexing agent skips or includes empty files when generating the indexed data based on the empty-file indicator.

9. The method of claim 1, wherein the one or more file patterns include an indication of a first file type that the indexing agent omits when generating the indexed data or an indication of a second file type that the indexing agent uses when generating the indexed data.

10. The method of claim 1, wherein the indexing configuration information further includes an activation indicator for each of the one or more data repositories, the activation indicator indicating whether a data repository will be included in the indexing and search results.

11. A computing device, the computing device comprising:
a processor; and
a memory, comprising instructions, which when executed by the processor, cause the processor to perform operations to configure the device to:
retrieve a tenant identifier of a plurality of tenant identifiers, each of the plurality of tenant identifiers identifying a set of users with authorized access to one or more data repositories of a plurality of data repositories;
configure an indexing agent associated with the tenant identifier based on indexing configuration information, the indexing configuration information including at least an identifier of the one or more data repositories, location information for accessing the one or more data repositories, and one or more file patterns;
retrieve indexed data associated with the tenant identifier from an indexing server executing the indexing agent, the indexed data including text data obtained by the indexing agent during indexing using at least one data file associated with the one or more file patterns and stored in the one or more data repositories, and a cryptographic hash of the at least one data file;
in response to validating a received search query is associated with a user of the set of users authorized to access the one or more data repositories and a tenant selection received with the search query matches the tenant identifier, determine search results based on applying the search query to the retrieved indexed data; and
provide an output of the search results, the search results including at least an indication of duplicate files within the one or more data repositories based on the cryptographic hash.

12. The computing device of claim 11, wherein executing the instructions further cause the processor to perform operations to configure the device to:
configure the indexing agent to execute automatically on the indexing server in one of a plurality of indexing modes.

13. The computing device of claim 12, wherein a first indexing mode of the plurality of indexing modes includes:
a near real-time execution mode where the indexing agent is configured to monitor the one or more data repositories in real-time for changes in the at least one data file since a prior indexing, and re-index the at least one data file upon detecting the changes.

14. The computing device of claim 13, wherein a second indexing mode of the plurality of indexing modes includes:
a polling execution mode where the indexing agent is configured to periodically determine whether the at least one data file includes the changes since the prior indexing, and perform the re-index upon detecting the changes.

15. The computing device of claim 11, wherein the indexed data further includes the tenant identifier and metadata of the at least one data file.

16. The computing device of claim 15, wherein executing the instructions further cause the processor to perform operations to configure the device to:
store the indexed data with the tenant identifier in a storage location associated with the tenant identifier.

17. A non-transitory computer-readable storage medium that stores instructions for execution by one or more processors of a computing device, the instructions to configure the one or more processors to:
- retrieve a tenant identifier of a plurality of tenant identifiers, each of the plurality of tenant identifiers identifying a set of users with authorized access to one or more data repositories of a plurality of data repositories;
- configure an indexing agent associated with the tenant identifier based on indexing configuration information, the indexing configuration information including at least an identifier of the one or more data repositories, location information for accessing the one or more data repositories, and one or more file patterns;
- retrieve indexed data associated with the tenant identifier from an indexing server executing the indexing agent, the indexed data including text data obtained by the indexing agent during indexing using at least one data file associated with the one or more file patterns and stored in the one or more data repositories, and a cryptographic hash of the at least one data file;
- in response to validating a received search query is associated with a user of the set of users authorized to access the one or more data repositories and a tenant selection received with the search query matches the tenant identifier, determine search results based on applying the search query to the retrieved indexed data; and
- provide an output of the search results, the search results including at least an indication of duplicate files within the one or more data repositories based on the cryptographic hash.

18. The non-transitory computer-readable storage medium of claim 17, wherein the instructions further configure the one or more processors to:
- configure the search results to include an access link to at least one of the data files satisfying the search query, the access link associated with a data repository of the plurality of data repositories that contains the at least one of the data files.

19. The non-transitory computer-readable storage medium of claim 17, wherein the instructions further configure the one or more processors to:
- configure the indexing agent with an empty-file indicator within the indexing configuration information, wherein the indexing agent skips or includes empty files when generating the indexed data based on the empty-file indicator.

20. The non-transitory computer-readable storage medium of claim 17, wherein the indexing configuration information further includes an activation indicator for each of the one or more data repositories, the activation indicator indicating whether a data repository will be included in the indexing and the search results.

* * * * *

UNITED STATES PATENT AND TRADEMARK OFFICE
CERTIFICATE OF CORRECTION

PATENT NO. : 11,475,154 B2
APPLICATION NO. : 16/797784
DATED : October 18, 2022
INVENTOR(S) : Nicholas Wayne Barrett It is certified that error appears in the above-identified patent and that said Letters Patent is hereby corrected as shown below:

In the Specification

In Column 9, Line 40, delete "forma" and insert --format-- therefor

In Column 10, Line 61, delete "600," and insert --602,-- therefor

Signed and Sealed this
Third Day of October, 2023

Katherine Kelly Vidal
*Director of the United States Patent and Trademark Office*